(12) United States Patent
Nishikawa et al.

(10) Patent No.: US 12,013,926 B2
(45) Date of Patent: Jun. 18, 2024

(54) VALET KEY DISTRIBUTION SYSTEM

(71) Applicant: SUBARU CORPORATION, Tokyo (JP)

(72) Inventors: Kouki Nishikawa, Tokyo (JP); Kazuki Tomimatsu, Tokyo (JP); Masato Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 332 days.

(21) Appl. No.: 17/674,515

(22) Filed: Feb. 17, 2022

(65) Prior Publication Data

US 2022/0269766 A1 Aug. 25, 2022

(30) Foreign Application Priority Data

Feb. 25, 2021 (JP) ................................ 2021-028327

(51) Int. Cl.
*G06F 21/35* (2013.01)
*G07C 9/00* (2020.01)
*G08B 29/16* (2006.01)

(52) U.S. Cl.
CPC ......... *G06F 21/35* (2013.01); *G07C 9/00309* (2013.01); *G08B 29/16* (2013.01)

(58) Field of Classification Search
None
See application file for complete search history.

(56) References Cited

U.S. PATENT DOCUMENTS

| 2019/0188817 A1* | 6/2019 | Yanagida | ......... G06Q 10/06311 |
| 2019/0287080 A1* | 9/2019 | Penilla | ....................... G06F 9/00 |
| 2021/0114557 A1* | 4/2021 | Arakawa | ................. G06F 21/35 |

FOREIGN PATENT DOCUMENTS

| JP | 2015-154283 A | 8/2015 |
| JP | 2015154283 A * | 8/2015 |
| JP | 2019105881 A * | 6/2019 |

\* cited by examiner

*Primary Examiner* — Eleni A Shiferaw
*Assistant Examiner* — Kaashif R Williams
(74) *Attorney, Agent, or Firm* — Rimon P.C.

(57) ABSTRACT

A valet key distribution system distributes key information of a vehicle among the vehicle, an owner terminal, and a guest terminal. The vehicle includes a vehicle-side storage storing a vehicle-side owner private key, a vehicle-side distribution key, a vehicle-side variable value, and a vehicle-side one-time password; and a vehicle-side controller controlling running of the vehicle and performing information processing. The owner terminal includes an owner-terminal input unit receiving an operation instruction from a utilization manager of the vehicle; an owner-side storage storing a terminal-side owner private key, a terminal-side distribution key, a terminal-side variable value, and a terminal-side one-time password; and an owner-side controller performing information processing. The guest terminal includes a guest-terminal input unit receiving an operation instruction from a temporary user of the vehicle; a guest-side storage storing the terminal-side distribution key and the terminal-side one-time password received; and a guest-side controller performing information processing.

5 Claims, 5 Drawing Sheets

VALET KEY DISTRIBUTION SYSTEM

CROSS-REFERENCE TO RELATED APPLICATIONS

The present application claims priority from Japanese Patent Application No. 2021-028327 filed on Feb. 25, 2021, the entire contents of which are hereby incorporated by reference.

BACKGROUND

The present disclosure relates to a valet key distribution system.

In North America and other regions, a service called a valet parking system is offered by establishments, such as restaurants, hotels, and malls. The valet parking system is a service in which a person in charge at the establishment (hereinafter referred to as a valet parking attendant) parks a vehicle in a parking space for a customer (owner of the vehicle) and brings the vehicle to, for example, an exit when the owner is on the way out. In this system, the owner of the vehicle gives the valet parking attendant a key called a valet key to allow the valet parking attendant to move the vehicle. Unlike a regular vehicle key, the valet key is designed to allow limited use of vehicle functions.

Systems that enable use of a mobile terminal as a vehicle key have been developed in recent years. Accordingly, a valet parking system, such as that described above, is configured to enable passing of a valet key using a mobile terminal. Since a mobile terminal owned by the owner of the vehicle cannot be simply passed to the valet parking attendant, a technique that enables passing of a valet key to a mobile terminal of the valet parking attendant is to be developed.

To use a new mobile terminal as a vehicle key, the mobile terminal is to be registered in the vehicle. A mobile terminal registration system has therefore been proposed, which enables a plurality of mobile terminals to be registered as vehicle keys. For additional registration of a new mobile terminal in this mobile terminal registration system, the new mobile terminal and a registered mobile terminal are prepared in proximity to a vehicle. To register the new mobile terminal, the vehicle is accessed from the new mobile terminal through the registered mobile terminal. This makes it unlikely that unauthorized registration will occur during additional registration of the mobile terminal (see, Japanese Unexamined Patent Application Publication No. 2015-154283).

SUMMARY

An aspect of the disclosure provides a valet key distribution system including a vehicle, an owner terminal to be used by a utilization manager of the vehicle, and a guest terminal to be used by a temporary user to temporarily use the vehicle. The valet key distribution system is configured to distribute key information of the vehicle among the vehicle, the owner terminal, and the guest terminal. The vehicle includes a vehicle-side storage and a vehicle-side controller. The vehicle-side storage is configured to store a vehicle-side owner private key, a vehicle-side distribution key, a vehicle-side variable value, and a vehicle-side one-time password. The vehicle-side controller is configured to control running of the vehicle and perform information processing in the vehicle. The owner terminal includes an owner-terminal input unit, an owner-side storage, and an owner-side controller. The owner-terminal input unit is configured to receive an operation instruction from the utilization manager. The owner-side storage is configured to store a terminal-side owner private key, a terminal-side distribution key, a terminal-side variable value, and a terminal-side one-time password. The owner-side controller is configured to perform information processing in the owner terminal. The guest terminal includes a guest-terminal input unit, a guest-side storage, and a guest-side controller. The guest-terminal input unit is configured to receive an operation instruction from the temporary user. The guest-side storage is configured to store the terminal-side distribution key and the terminal-side one-time password received. The guest-side controller is configured to perform information processing in the guest terminal. The owner-terminal input unit is configured to receive an instruction to transmit the terminal-side owner private key. The owner-side controller is configured to transmit, in a case where the instruction to transmit the terminal-side owner private key is received, the terminal-side owner private key stored in the owner-side storage to the vehicle. The vehicle-side controller is configured to check, upon receiving the terminal-side owner private key from the owner terminal, the received terminal-side owner private key against the vehicle-side owner private key stored in the vehicle-side storage, permit normal use of the vehicle in a case where the terminal-side owner private key is authenticated, transmit the vehicle-side variable value to the owner terminal, generate the vehicle-side one-time password on the basis of the vehicle-side variable value, and store the vehicle-side one-time password in the vehicle-side storage. The owner-side controller is configured to rewrite, in a case where the vehicle-side variable value is received from the vehicle, the terminal-side variable value to the vehicle-side variable value received, store the rewritten terminal-side variable value in the owner-side storage, generate the terminal-side one-time password on the basis of the rewritten terminal-side variable value in the same way as generating the vehicle-side one-time password in the vehicle, store the terminal-side one-time password in the owner-side storage, and update the terminal-side variable value upon transmitting the terminal-side distribution key and the terminal-side one-time password to the guest terminal. The guest-side controller is configured to store the terminal-side distribution key and the terminal-side one-time password in the guest-side storage in a case where the terminal-side distribution key and the terminal-side one-time password are received from the owner terminal. The guest-terminal input unit is configured to receive an instruction to transmit the terminal-side distribution key. The guest-side controller is configured to transmit, in a case where the instruction to transmit the terminal-side distribution key is received, the terminal-side distribution key and the terminal-side one-time password stored in the guest-side storage to the vehicle. The vehicle-side controller is configured to check, upon receiving the terminal-side distribution key and the terminal-side one-time password, the terminal-side distribution key and the terminal-side one-time password against the vehicle-side distribution key and the vehicle-side one-time password stored in the vehicle-side storage, enable some functions of the vehicle to permit limited use of the vehicle in a case where the terminal-side distribution key and the terminal-side one-time password are authenticated, update the vehicle-side variable value, generate the vehicle-side one-time password on the basis of the updated vehicle-side variable value, and store the vehicle-side one-time password in the vehicle-side storage.

An aspect of the disclosure provides a valet key distribution system including a vehicle, an owner terminal to be used by a utilization manager of the vehicle, and a guest terminal to be used by a temporary user to temporarily use the vehicle. The valet key distribution system is configured to distribute key information of the vehicle among the vehicle, the owner terminal, and the guest terminal. The vehicle includes first circuitry configured to store a vehicle-side owner private key, a vehicle-side distribution key, a vehicle-side variable value, and a vehicle-side one-time password, and control running of the vehicle and perform information processing in the vehicle. The owner terminal includes second circuitry configured to receive an operation instruction from the utilization manager, store a terminal-side owner private key, a terminal-side distribution key, a terminal-side variable value, and a terminal-side one-time password, and perform information processing in the owner terminal. The guest terminal includes third circuitry configured to receive an operation instruction from the temporary user, store the terminal-side distribution key and the terminal-side one-time password received, and perform information processing in the guest terminal. The second circuitry of the owner terminal is configured to receive an instruction to transmit the terminal-side owner private key, and transmit, in a case where the instruction to transmit the terminal-side owner private key is received, the stored terminal-side owner private key to the vehicle. The first circuitry of the vehicle is configured to check, upon receiving the terminal-side owner private key from the owner terminal, the received terminal-side owner private key against the stored vehicle-side owner private key, permit normal use of the vehicle in a case where the terminal-side owner private key is authenticated, transmit the vehicle-side variable value to the owner terminal, generate the vehicle-side one-time password on the basis of the vehicle-side variable value, and store the vehicle-side one-time password.

The second circuitry of the owner terminal is configured to rewrite, in a case where the vehicle-side variable value is received from the vehicle, the terminal-side variable value to the vehicle-side variable value received, store the rewritten terminal-side variable value, generate the terminal-side one-time password on the basis of the rewritten terminal-side variable value in the same way as generating the vehicle-side one-time password in the vehicle, store the terminal-side one-time password, and update the terminal-side variable value upon transmitting the terminal-side distribution key and the terminal-side one-time password to the guest terminal. The third circuitry of the guest terminal is configured to store the terminal-side distribution key and the terminal-side one-time password in a case where the terminal-side distribution key and the terminal-side one-time password are received from the owner terminal, receive an instruction to transmit the terminal-side distribution key, and transmit, in a case where the instruction to transmit the terminal-side distribution key is received, the terminal-side distribution key and the terminal-side one-time password stored to the vehicle. The first circuitry of the vehicle is configured to check, upon receiving the terminal-side distribution key and the terminal-side one-time password, the terminal-side distribution key and the terminal-side one-time password against the vehicle-side distribution key and the vehicle-side one-time password stored, enable some functions of the vehicle to permit limited use of the vehicle in a case where the terminal-side distribution key and the terminal-side one-time password are authenticated, update the vehicle-side variable value, generate the vehicle-side one-time password on the basis of the updated vehicle-side variable value, and store the vehicle-side one-time password.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In the valet parking system, since passing of a valet key does not necessarily take place near the vehicle, the owner of the vehicle may take the trouble of going to the vehicle to register a key.

With a physical valet key, a person who carries the key can move the vehicle. Unauthorized use of key information can be discovered because of physical destruction of the key. In the case of a digital key, however, theft of distributed key information may not be identified.

Moreover, if the valet parking system is configured such that authentication for passing of a valet key or utilization of a vehicle involves online access to a server or other devices, the valet key cannot be passed or the vehicle cannot be used in a location (e.g., underground parking) where there is no online connection.

The present disclosure has been made to solve the problems described above. It is desirable to provide a valet key distribution system that is both convenient and secure and can be used even in an offline environment.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
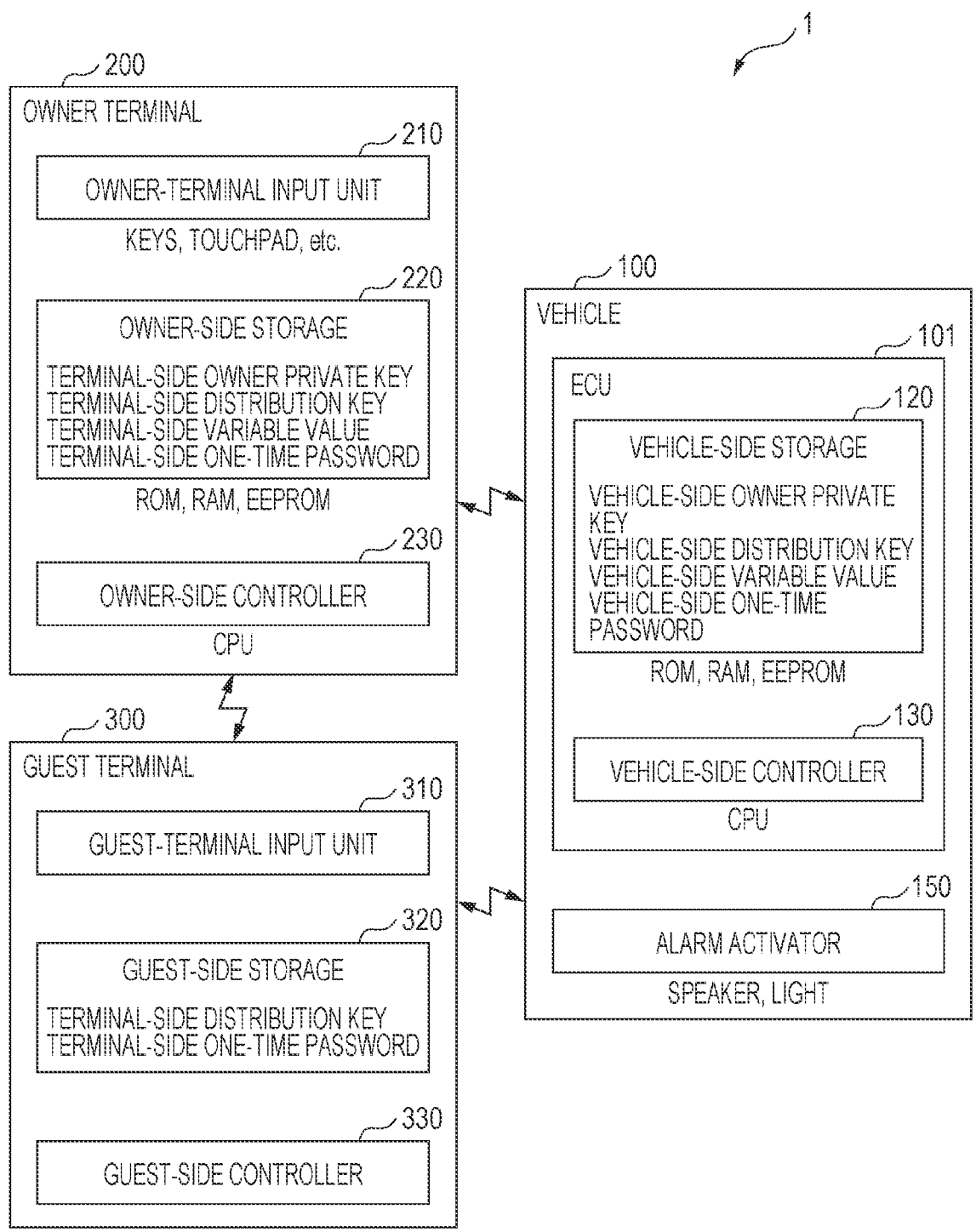
FIG. 1 is a schematic diagram illustrating a configuration of a valet key distribution system according to an embodiment of the present disclosure.

FIG. 1 is a schematic diagram illustrating a configuration of a valet key distribution system according to the embodiment of the present disclosure.

(Configuration of Valet Key Distribution System 1)

As illustrated in FIG. 1, a valet key distribution system 1 includes a vehicle 100, an owner terminal 200 used by an owner of the vehicle 100, and a guest terminal 300 used by a valet parking attendant. The valet key distribution system 1 is configured to distribute key information of the vehicle 100 among the vehicle 100, the owner terminal 200, and the guest terminal 300.

The term "owner" refers to a person who actually uses the vehicle 100 or a utilization manager of the vehicle 100, as well as to a person who owns the vehicle 100. That is, the term "owner" used herein refers to a person who has driven the vehicle 100 to the establishment which offers the valet key distribution system 1. The term "valet parking attendant" refers to a person (temporary user) who temporarily uses the vehicle 100 to park the vehicle 100 for the owner in a predetermined parking space and bring the vehicle 100 from the parking space back to the owner.

In the valet key distribution system 1 according to the present embodiment, all transmission and reception between the vehicle 100 and the owner terminal 200, between the owner terminal 200 and the guest terminal 300, and between the guest terminal 300 and the vehicle 100 take place via near-field communication that enables communication over a distance from about several to several tens of centimeters (cm), or via dedicated short-range communication that enables communication over a distance of about several meters (m). The valet key distribution system 1 thus enables all processes without using the Internet environment or host servers.

(Vehicle 100)

The vehicle 100 includes an electronic control unit (ECU) 101 and an alarm activator 150. The ECU 101 includes a vehicle-side storage 120 and a vehicle-side controller 130.

(Vehicle-Side Storage 120)

The vehicle-side storage 120 includes, for example, a read only memory (ROM) configured to store control programs executed by a central processing unit (CPU), data tables, commands, and data; a random access memory (RAM) configured to temporarily store data; and an electrically erasable and programmable read only memory (EEPROM) constituted by a rewritable nonvolatile memory.

The vehicle-side storage 120 stores a vehicle-side owner private key, a vehicle-side distribution key, a vehicle-side variable value, and a vehicle-side one-time password.

(Vehicle-Side Controller 130)

The vehicle-side controller 130 is constituted, for example, by a CPU.

The vehicle-side controller 130 controls running of the vehicle 100 and opening and closing of the vehicle doors, and performs information processing.

For example, when a terminal-side owner private key is received from the owner terminal 200, the vehicle-side controller 130 checks the received terminal-side owner private key against a vehicle-side owner private key stored in the vehicle-side storage 120. If the received terminal-side owner private key is authenticated, the vehicle-side controller 130 permits normal use of the vehicle 100. At the time of the authentication, the vehicle-side controller 130 transmits a vehicle-side variable value to the owner terminal 200, generates a vehicle-side one-time password on the basis of the vehicle-side variable value, and stores the vehicle-side one-time password in the vehicle-side storage 120.

When a terminal-side distribution key and a terminal-side one-time password are received, the vehicle-side controller 130 checks them against the vehicle-side distribution key and the vehicle-side one-time password stored in the vehicle-side storage 120. If the authentication is successful, the vehicle-side controller 130 enables some functions of the vehicle 100 to permit limited use of the vehicle 100. At the time of the authentication, the vehicle-side controller 130 updates the vehicle-side variable value, generates a vehicle-side one-time password on the basis of the updated vehicle-side variable value, and stores the vehicle-side one-time password in the vehicle-side storage 120.

If the terminal-side distribution key and the terminal-side one-time password received are not authenticated in checking against the vehicle-side distribution key and the vehicle-side one-time password stored in the vehicle-side storage 120, the vehicle-side controller 130 does not permit use of the vehicle 100 and notifies the owner terminal 200 of unauthorized access.

The permission of normal use allows use of all the functions of the vehicle 100, such as engine control and locking and unlocking of doors. The permission of limited use enables some of the functions of the vehicle 100 and allows use of the enabled functions. That is, the permission of limited use limits the range of available functions and allows, for example, locking and unlocking of the driver's door (i.e., does not allow unlocking of the trunk and the glove compartment) and driving within a limited travel distance or predetermined range.

(Alarm Activator 150)

The alarm activator 150 includes, for example, a speaker and a light.

If an attempt of unauthorized use of the vehicle 100, such as unauthorized access to the vehicle 100, is detected, the alarm activator 150 outputs an alarm with sound or light. For example, if a terminal-side distribution key and a terminal-side one-time password received and checked, by the vehicle-side controller 130, against a vehicle-side distribution key and a vehicle-side one-time password stored in the vehicle-side storage 120 are not authenticated, the alarm activator 150 activates an alarm indicating unauthorized access and outputs the alarm.

(Owner Terminal 200)

The owner terminal 200 is, for example, an intelligent mobile phone. The owner terminal 200 includes an owner-terminal input unit 210, an owner-side storage 220, and an owner-side controller 230.

(Owner-Terminal Input Unit 210)

The owner-terminal input unit 210 is an operation key input unit. For example, the owner-terminal input unit 210 may be a keyboard or a touch panel.

The owner-terminal input unit 210 receives an operation instruction from the owner. For example, during use of the vehicle 100 or in a key distribution preparation process (described below), the owner-terminal input unit 210 receives an instruction to transmit a terminal-side owner private key.

(Owner-Side Storage 220)

The owner-side storage 220 includes, for example, a ROM, a RAM, and an EEPROM.

The owner-side storage 220 stores a terminal-side owner private key, a terminal-side distribution key, a terminal-side variable value, and a terminal-side one-time password.

(Owner-Side Controller 230)

The owner-side controller 230 is constituted, for example, by a CPU.

The owner-side controller 230 performs, for example, information processing in the owner terminal 200.

For example, when an instruction to transmit a terminal-side owner private key is received, the owner-side controller 230 performs processing for transmitting the terminal-side owner private key stored in the owner-side storage 220 to the vehicle 100.

When a terminal-side distribution key and a terminal-side one-time password are transmitted to the guest terminal 300, the owner-side controller 230 updates a terminal-side variable value.

(Guest Terminal 300)

Like the owner terminal 200, the guest terminal 300 is, for example, an intelligent mobile phone.

The guest terminal 300 includes a guest-terminal input unit 310, a guest-side storage 320, and a guest-side controller 330.

(Guest-Terminal Input Unit 310)

The guest-terminal input unit 310 is an operation key input unit. For example, the guest-terminal input unit 310 may be a keyboard or a touch panel.

The guest-terminal input unit 310 receives an operation instruction from the valet parking attendant.

For example, the guest-terminal input unit 310 receives an instruction to transmit a terminal-side distribution key.

(Guest-Side Storage 320)

The guest-side storage 320 includes, for example, a ROM, a RAM, and an EEPROM.

The guest-side storage 320 stores a terminal-side distribution key and a terminal-side one-time password received from the owner terminal 200.

(Guest-Side Controller 330)

The guest-side controller 330 is constituted, for example, by a CPU.

The guest-side controller 330 performs, for example, information processing in the guest terminal 300.

For example, when a terminal-side distribution key and a terminal-side one-time password are received from the owner terminal 200, the guest-side controller 330 stores them in the guest-side storage 320.

When an instruction to transmit a terminal-side distribution key is received, the guest-side controller 330 transmits the terminal-side distribution key and the terminal-side one-time password stored in the guest-side storage 320 to the vehicle 100.

(Valet Key Distribution Control Procedure)

A valet key distribution control procedure in the valet key distribution system 1 will now be described.

Figure 2:
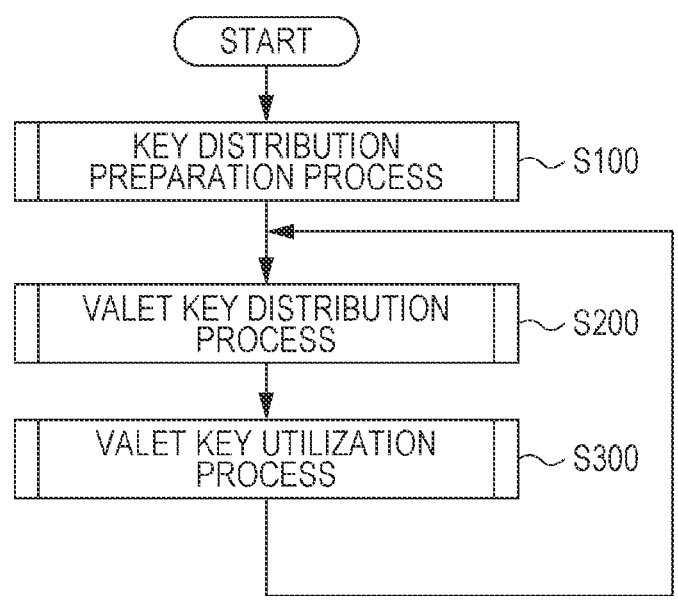
FIG. 2 is a flowchart illustrating a valet key distribution control procedure according to the present embodiment.
Figure 4:
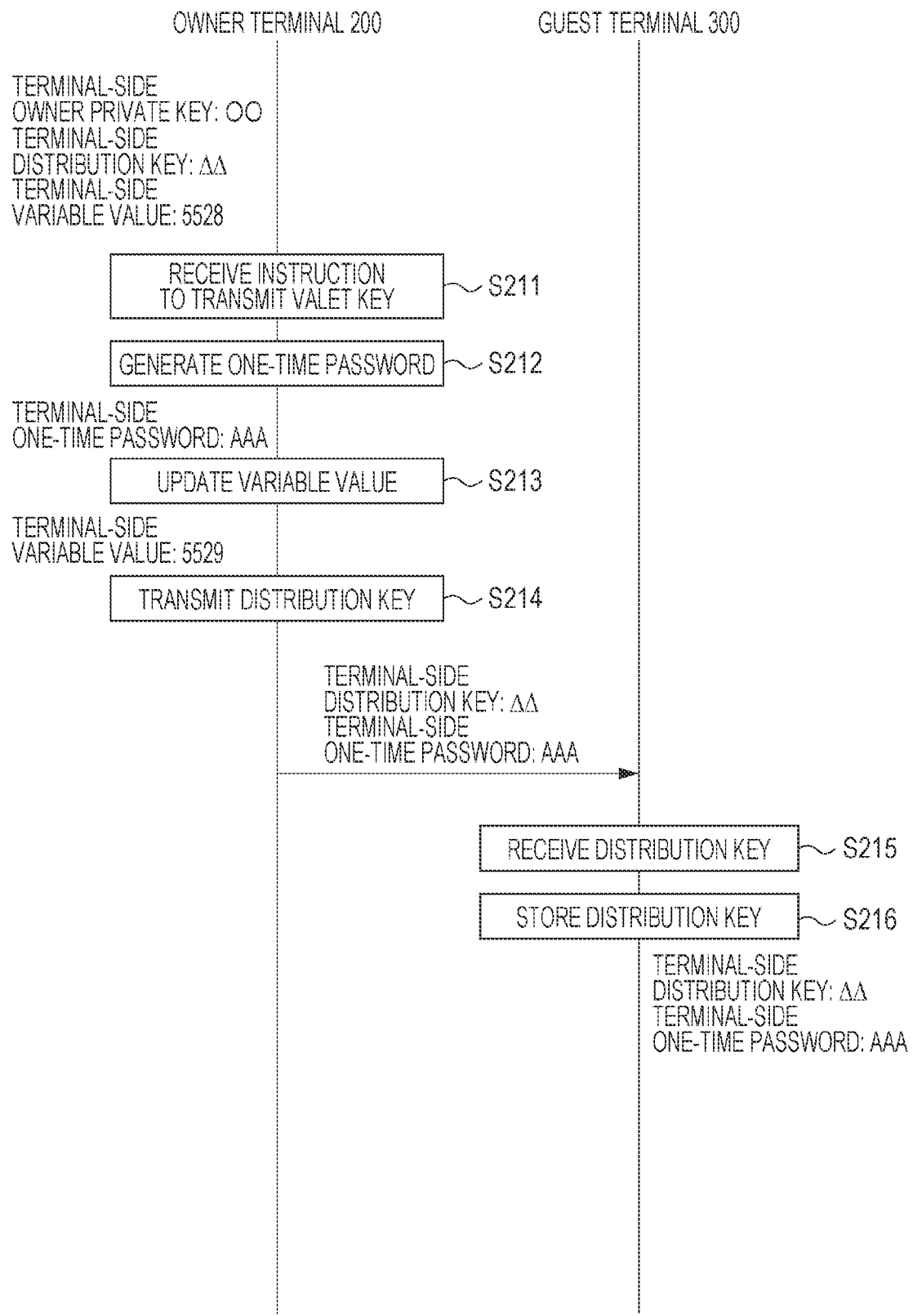
FIG. 4 is a flowchart illustrating a valet key distribution process in the valet key distribution control procedure.
Figure 5:
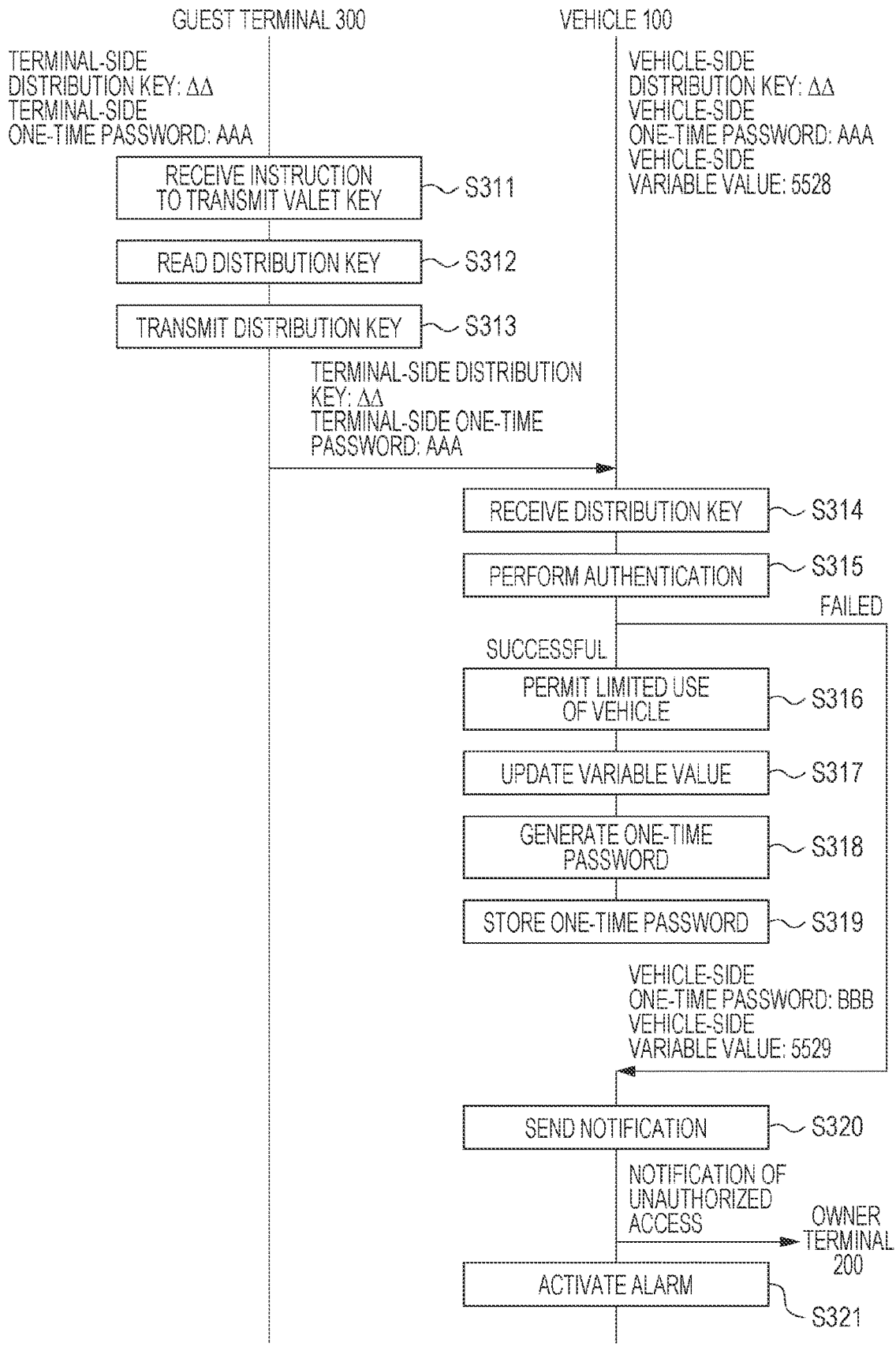
FIG. 5 is a flowchart illustrating a valet key utilization process in the valet key distribution control procedure.

FIG. 2 is a flowchart illustrating a valet key distribution control procedure in the valet key distribution system 1. FIG. is a flowchart illustrating a key distribution preparation process in the valet key distribution control procedure. FIG. 4 is a flowchart illustrating a valet key distribution process in the valet key distribution control procedure. FIG. 5 is a flowchart illustrating a valet key utilization process in the valet key distribution control procedure.

As illustrated in FIG. 2, the valet key distribution control procedure includes a key distribution preparation process (step S100), a valet key distribution process (step S200), and a valet key utilization process (step S300).

The key distribution preparation process (step S100) is a preparation process for carrying out the valet key distribution control procedure. The key distribution preparation process is a process that synchronizes the distribution keys (the vehicle-side distribution key and the terminal-side distribution key) and the variable values (the vehicle-side variable value and the terminal-side variable value) between the vehicle 100 and the owner terminal 200. The details of the key distribution preparation process (step S100) will be described later below.

The valet key distribution process (step S200) is a process in which the owner distributes a valet key to the valet parking attendant. In the valet key distribution process, a terminal-side distribution key is passed from the owner terminal 200 to the guest terminal 300. The details of the valet key distribution process (step S200) will be described later below.

The valet key utilization process (step S300) is a process executed when the valet parking attendant uses the vehicle 100 with a terminal-side distribution key (valet key). The valet key utilization process performs authentication on the terminal-side distribution key and permits (or prohibits) limited use of the vehicle 100. The details of the valet key utilization process (step S300) will be described later below.

After completion of the valet key utilization process (step S300), the process returns to the valet key distribution process (step S200) and repeats the operation described above.

(Key Distribution Preparation Process)

The key distribution preparation process will now be described.

As described, the key distribution preparation process is a process that synchronizes the distribution keys (the vehicle-side distribution key and the terminal-side distribution key) and the variable values (the vehicle-side variable value and the terminal-side variable value) between the vehicle 100 and the owner terminal 200.

Figure 3:
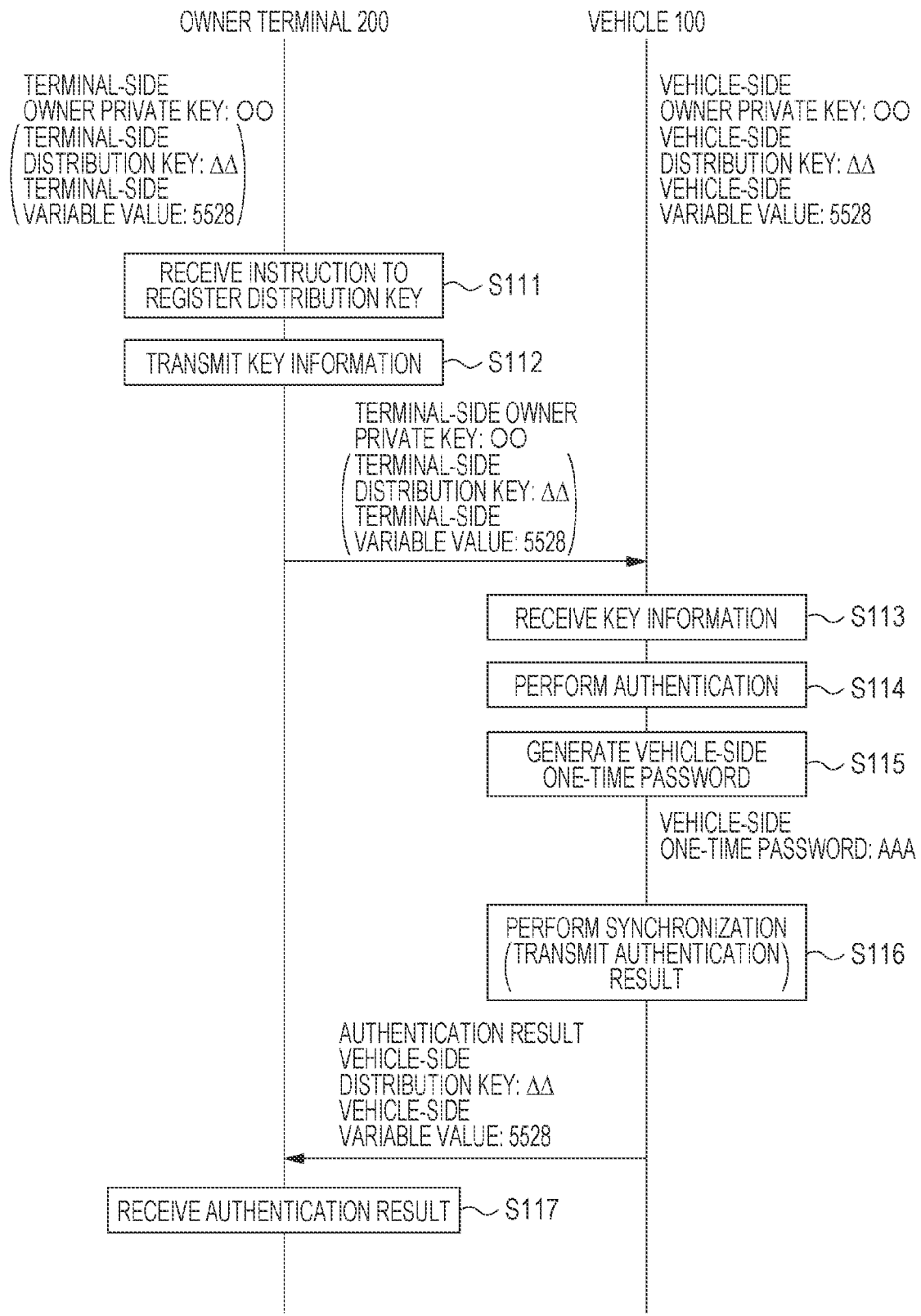
FIG. 3 is a flowchart illustrating a key distribution preparation process in the valet key distribution control procedure.

As illustrated in FIG. 3, in the key distribution preparation process, the owner terminal 200 first receives an instruction to register a distribution key (step S111). Here, the owner enters, into the owner-terminal input unit 210, an instruction to register a distribution key.

In response to the instruction to register the distribution key, the owner-side controller 230 reads key information from the owner-side storage 220 and transmits the read key information to the vehicle 100 (step S112).

The key information transmitted here is a terminal-side owner private key (written as "○○" for ease of reference; the same applies to similar instances). As described below, the owner terminal 200 receives a vehicle-side distribution key (ΔΔ) and a vehicle-side variable value (5528) from the vehicle 100 and synchronizes them with the terminal-side distribution key and the terminal-side variable value. However, the owner terminal 200 may transmit a terminal-side distribution key (ΔΔ) and a terminal-side variable value (5528), together with the terminal-side owner private key (○○), to the vehicle 100, where the terminal-side distribution key (ΔΔ) and the terminal-side variable value (5528) are synchronized with the vehicle-side distribution key and the vehicle-side variable value.

Alternatively, the owner terminal 200 may transmit one of the terminal-side distribution key (ΔΔ) and the terminal-side variable value (5528), together with the terminal-side owner private key (○○), to the vehicle 100.

The vehicle 100 receives the key information (terminal-side owner private key (○○); the terminal-side distribution key (ΔΔ) and the terminal-side variable value (5528) may also be included in the key information) transmitted from the owner terminal 200 (step S113).

Upon receiving the key information (terminal-side owner private key (○○)) from the owner terminal 200, the vehicle-side controller 130 checks the received terminal-side owner private key (○○) against a vehicle-side owner private key (○○) stored in the vehicle-side storage 120 for authentication (step S114).

As described above, when the vehicle 100 also receives both the terminal-side distribution key (ΔΔ) and the terminal-side variable value (5528), or one of the terminal-side distribution key (ΔΔ) and the terminal-side variable value (5528), the terminal-side distribution key (ΔΔ) and the terminal-side variable value (5528) received are stored as the vehicle-side distribution key (ΔΔ) and the vehicle-side variable value (5528), respectively, in the vehicle-side storage 120 to be synchronized.

If the received terminal-side owner private key (◯◯) is authenticated, the vehicle-side controller 130 generates a vehicle-side one-time password (AAA) on the basis of the vehicle-side variable value (5528) (step S115). The vehicle-side one-time password (AAA) is generated by a predetermined computing equation using the vehicle-side variable value (5528).

If the authentication is successful, the vehicle-side controller 130 transmits the vehicle-side distribution key (ΔΔ) and the vehicle-side variable value (5528) to the owner terminal 200 for synchronization of the distribution keys and the variable values (step S116). If the authentication is not successful in the checking, the vehicle-side controller 130 notifies the owner terminal 200 that the authentication has failed.

If both the terminal-side distribution key (ΔΔ) and the terminal-side variable value (5528) are received from the owner terminal 200, the vehicle-side controller 130 simply notifies the owner terminal 200 of the authentication result. If one of the terminal-side distribution key (ΔΔ) and the terminal-side variable value (5528) is received from the owner terminal 200, the vehicle-side controller 130 transmits the vehicle-side distribution key (ΔΔ) or the vehicle-side variable value (5528), corresponding to the other (unreceived one) of the terminal-side distribution key (ΔΔ) and the terminal-side variable value (5528), to the owner terminal 200.

The owner terminal 200 receives the vehicle-side distribution key (ΔΔ) and the vehicle-side variable value (5528), or the authentication result, transmitted from the vehicle 100 (step S117). The owner-side controller 230 then stores the vehicle-side distribution key (ΔΔ) and the vehicle-side variable value (5528) as the terminal-side distribution key (ΔΔ) and the terminal-side variable value (5528), respectively, in the owner-side storage 220.

If the terminal-side owner private key (◯◯) transmitted is authenticated in the vehicle 100, the terminal-side distribution key (ΔΔ) serving as a valet key can be distributed to the valet parking attendant. At the same time, the distribution keys (the vehicle-side distribution key and the terminal-side distribution key) and the variable values (the vehicle-side variable value and the terminal-side variable value) are synchronized between the vehicle 100 and the owner terminal 200.

Conversely, if the terminal-side owner private key transmitted is not authenticated in the vehicle 100, the terminal-side distribution key cannot be used as a valet key.

(Valet Key Distribution Process)

The valet key distribution process will now be described.

As described above, the valet key distribution process is a process in which the owner distributes a valet key (terminal-side distribution key) to the valet parking attendant.

As illustrated in FIG. 4, in the valet key distribution process, the owner terminal 200 first receives a valet key transmission instruction (step S211). Here, the owner enters, into the owner-terminal input unit 210, an instruction to transmit a valet key (terminal-side distribution key) to the guest terminal 300.

Instead of receiving the valet key transmission instruction to transmit a valet key to the guest terminal 300, the owner terminal 200 may receive a request from the guest terminal 300 for transmitting a valet key. In this case, the valet parking attendant enters a valet key transmission request for transmitting a valet key (terminal-side distribution key) into the guest-terminal input unit 310 of the guest terminal 300, from which the valet key transmission request is transmitted to the owner terminal 200. The valet key distribution process is thus executed.

When the valet key transmission instruction is received, the owner-side controller 230 generates a terminal-side one-time password (AAA) on the basis of the terminal-side variable value (5528) stored in the owner-side storage 220 (step S212). The owner-side controller 230 generates the terminal-side one-time password in the same way as generating the vehicle-side one-time password using the vehicle-side variable value in the vehicle 100. That is, the terminal-side one-time password is generated by the same algorithm and computation as those for generating the vehicle-side one-time password.

Upon completion of generating the terminal-side one-time password (AAA), the owner-side controller 230 increments (+1) the terminal-side variable value (5528) (step S213). Updating of the terminal-side variable value upon completion of generating the terminal-side one-time password may not necessarily be done by increment (+1), but by a predetermined computation. Note that the terminal-side variable value is to be updated by the same computation as for updating a vehicle-side variable value (described below).

The owner-side controller 230 stores the updated terminal-side variable value (5529) and the generated terminal-side one-time password (AAA) in the owner-side storage 220.

Then, the owner-side controller 230 reads the terminal-side distribution key (ΔΔ) from the owner-side storage 220, and transmits the read terminal-side distribution key (ΔΔ) and the terminal-side one-time password (AAA) to the guest terminal 300 (step S214).

The guest terminal 300 receives the terminal-side distribution key (ΔΔ) and the terminal-side one-time password (AAA) transmitted from the owner terminal 200 (step S215).

Upon receiving the terminal-side distribution key (ΔΔ) and the terminal-side one-time password (AAA) from the owner terminal 200, the guest-side controller 330 stores them in the guest-side storage 320 (step S216).

The process described above enables the guest terminal 300 to acquire the terminal-side distribution key (ΔΔ) and the terminal-side one-time password (AAA).

(Valet Key Utilization Process)

The valet key utilization process will now be described.

As described above, the valet key utilization process is a process executed when the valet parking attendant uses the vehicle 100 with a terminal-side distribution key (valet key). The valet key utilization process performs authentication on the terminal-side distribution key and permits (or prohibits) limited use of the vehicle 100.

As illustrated in FIG. 5, in the valet key utilization process, the guest terminal 300 first receives a valet key transmission instruction (step S311). To use the vehicle 100, the valet parking attendant enters, into the guest-terminal input unit 310, an instruction to transmit a valet key (terminal-side distribution key) to the vehicle 100.

When the valet key transmission instruction is received, the guest-side controller 330 reads the terminal-side distribution key (ΔΔ) and the terminal-side one-time password (AAA) stored in the guest-side storage 320 (step S312).

Next, the guest-side controller 330 transmits the read terminal-side distribution key (ΔΔ) and terminal-side one-time password (AAA) to the vehicle 100 (step S313).

The vehicle 100 receives the terminal-side distribution key (ΔΔ) and the terminal-side one-time password (AAA) transmitted from the guest terminal 300 (step S314).

Upon receiving the terminal-side distribution key (ΔΔ) and the terminal-side one-time password (AAA) from the guest terminal 300, the vehicle-side controller 130 checks the received terminal-side distribution key (ΔΔ) and terminal-side one-time password (AAA) against the vehicle-side distribution key (ΔΔ) and the vehicle-side one-time password (AAA) stored in the vehicle-side storage 120 for authentication (step S315).

If the received terminal-side distribution key (ΔΔ) and terminal-side one-time password (AAA) match the vehicle-side distribution key (ΔΔ) and the vehicle-side one-time password (AAA), the vehicle-side controller 130 permits limited use of the vehicle 100 (step S316).

Note that when limited use of the vehicle 100 is permitted, for example, not all the vehicle doors can be unlocked, or available driving functions are limited.

If the authentication is successful, the valet parking attendant is granted limited use of the vehicle 100.

After the authentication, the vehicle-side controller 130 increments (+1) the vehicle-side variable value (5528) (step S317). Updating of the vehicle-side variable value may not necessarily be done by increment (+1), but by a predetermined computation. Note, however, that the vehicle-side variable value is to be updated by the same computation as for updating the terminal-side variable value described above.

Next, the vehicle-side controller 130 generates a vehicle-side one-time password (BBB) on the basis of the updated vehicle-side variable value (5529) (step S318). The vehicle-side one-time password is generated in the same manner as in generating the vehicle-side one-time password in the key distribution preparation process (though the vehicle-side variable value is changed).

Then, the vehicle-side controller 130 stores the updated vehicle-side variable value (5529) and the generated vehicle-side one-time password (BBB) in the vehicle-side storage 120 (step S319).

Accordingly, in the valet key distribution system 1 according to the present embodiment, the valet parking attendant with the terminal-side distribution key is granted limited use of the vehicle 100 the first time. However, the limited use is not permitted the second and subsequent times, because the terminal-side one-time password and the vehicle-side one-time password differ.

When the owner permits another use of the vehicle 100 (i.e., permits use of the terminal-side distribution key (ΔΔ)), a terminal-side one-time password (BBB) newly generated on the basis of the terminal-side variable value (5529) (obtained by updating in step S213) is distributed from the owner terminal 200 to the guest terminal 300. This allows one-time limited use of the vehicle 100, with permission of the owner. The owner can thus easily grant one-time limited use of the vehicle 100 to the valet parking attendant for the second time. Since the terminal-side one-time password is changed (in such a manner as AAA→BBB→ . . . ) for each distribution of the terminal-side distribution key (ΔΔ), the owner can prevent unauthorized use of the vehicle 100.

For the authentication (step S315), the vehicle-side controller 130 checks the received terminal-side distribution key (ΔΔ) and terminal-side one-time password (AAA) against the vehicle-side distribution key (ΔΔ) and vehicle-side one-time password (BBB) stored in the vehicle-side storage 120. If the authentication is failed, the vehicle-side controller 130 sends a notification to the owner terminal 200 (step S320). That is, if the keys or the passwords do not match in the authentication, the vehicle-side controller 130 notifies the owner terminal 200 that there has been unauthorized access to the vehicle 100. This enables the owner to recognize that there has been unauthorized access to the vehicle 100.

If the authentication (step S315) is failed, the vehicle-side controller 130 outputs an alarm notification to the alarm activator 150.

Upon receiving the alarm notification from the vehicle-side controller 130, the alarm activator 150 produces alarm sound or light to emit a loud sound or light from the vehicle 100 (step S321). This gives a warning to an unauthorized person attempting to use the vehicle 100 and protects the vehicle 100 from unauthorized use.

As described above, the valet key distribution system 1 according to the present embodiment enables passing of a valet key (or the terminal-side distribution key serving as a valet key) and use of the valet key via near-field communication or dedicated short-range communication. Also, the valet key distribution system 1 makes it possible to prevent, with a simple operation, the valet parking attendant from using the valet key the second and subsequent times. A valet key distribution system can thus be provided which is both convenient and secure and can be used even in an offline environment where there is no online connection.

The valet key distribution system 1 according to the present embodiment is implemented when programs stored, for example, in the ROM, the RAM, and the EEPROM of each of the vehicle 100, the owner terminal 200, and the guest terminal 300 are developed in the RAM of the corresponding device and executed by the CPU of the device.

The vehicle 100, the owner terminal 200, and the guest terminal 300 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle 100, the owner terminal 200, and the guest terminal 300. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A valet key distribution system for valet parking comprising a vehicle, an owner terminal to be used by a utilization manager of the vehicle, and a guest terminal to be used by a temporary user to temporarily use the vehicle;
the valet key distribution system being configured to distribute key information of the vehicle among the vehicle, the owner terminal, and the guest terminal, wherein the valet key distribution system operates in a case of an online environment and in a case of offline environment where there is no online server connection outside the valet key distribution system;

wherein:

the vehicle comprises:

a vehicle-side storage configured to store a vehicle-side owner private key, a vehicle-side distribution key, a vehicle-side variable value, and a vehicle-side one-time password, and a vehicle-side controller configured to control running of the vehicle and perform information processing in the vehicle;

the owner terminal comprises:

an owner-terminal input unit, comprising a keyboard or a touch panel, configured to receive a utilization manager operation instruction from the utilization manager, an owner-side storage configured to store a terminal-side owner private key, a terminal-side distribution key, a terminal-side variable value, and a terminal-side one-time password, and an owner-side controller configured to perform information processing in the owner terminal;

the guest terminal comprises:

a guest-terminal input unit, comprising a keyboard or a touch panel configured to receive a temporary user operation instruction from the temporary user, a guest-side storage configured to store the terminal-side distribution key and the terminal-side one-time password received, and a guest-side controller configured to perform information processing in the guest terminal;

the owner-terminal input unit is configured to receive an instruction to transmit the terminal-side owner private key;

the owner-side controller is configured to transmit, in a case where the instruction to transmit the terminal-side owner private key is received, the terminal-side owner private key stored in the owner-side storage to the vehicle;

the vehicle-side controller is configured to:

check, upon receiving the terminal-side owner private key from the owner terminal, the received terminal-side owner private key against the vehicle-side owner private key stored in the vehicle-side storage, permit normal use of the vehicle in a case where the terminal-side owner private key is authenticated, transmit the vehicle-side variable value to the owner terminal, generate the vehicle-side one-time password based on the vehicle-side variable value, and store the vehicle-side one-time password in the vehicle-side storage;

the owner-side controller is configured to:

rewrite, in a case where the vehicle-side variable value is received from the vehicle, the terminal-side variable value to the vehicle-side variable value received, store the rewritten terminal-side variable value in the owner-side storage, generate the terminal-side one-time password based on the rewritten terminal-side variable value utilizing similar algorithm and computation used in generating the vehicle-side one-time password in the vehicle, store the terminal-side one-time password in the owner-side storage, and update, utilizing a predetermined computation, the terminal-side variable value upon transmitting the terminal-side distribution key and the terminal-side one-time password to the guest terminal;

the guest-side controller is configured to store the terminal-side distribution key and the terminal-side one-time password in the guest-side storage in a case where the terminal-side distribution key and the terminal-side one-time password are received from the owner terminal;

the guest-terminal input unit is configured to receive an instruction to transmit the terminal-side distribution key;

the guest-side controller is configured to transmit, in a case where the instruction to transmit the terminal-side distribution key is received, the terminal-side distribution key and the terminal-side one-time password stored in the guest-side storage to the vehicle; and the vehicle-side controller is configured to:

check, upon receiving the terminal-side distribution key and the terminal-side one-time password, the terminal-side distribution key and the terminal-side one-time password against the vehicle-side distribution key and the vehicle-side one-time password stored in the vehicle-side storage, enable some functions of the vehicle to permit limited use of the vehicle in a case where the terminal-side distribution key and the terminal-side one-time password are authenticated, update, utilizing the predetermined computation, the vehicle-side variable value, generate the vehicle-side one-time password based on the updated vehicle-side variable value, and store the vehicle-side one-time password in the vehicle-side storage.

2. The valet key distribution system according to claim 1, wherein the vehicle-side controller is configured to receive the terminal-side distribution key and the terminal-side one-time password, check the terminal-side distribution key and the terminal-side one-time password against the vehicle-side distribution key and the vehicle-side one-time password stored in the vehicle-side storage, prohibit use of the vehicle in a case where the terminal-side distribution key and the terminal-side one-time password are not authenticated, and notify the owner terminal of unauthorized access.

3. The valet key distribution system according to claim 1, wherein the vehicle further comprises an alarm activator configured to activate sound or light alarm in response to unauthorized access; and the vehicle-side controller is configured to receive the terminal-side distribution key and the terminal-side one-time password, check the terminal-side distribution key and the terminal-side one-time password against the vehicle-side distribution key and the vehicle-side one-time password stored in the vehicle-side storage, and cause the alarm activator to output an alarm in a case where the terminal-side distribution key and the terminal-side one-time password are not authenticated.

4. The valet key distribution system according to claim 2, wherein the vehicle further comprises an alarm activator configured to activate sound or light alarm in response to unauthorized access; and the vehicle-side controller is configured to receive the terminal-side distribution key and the terminal-side one-time password, check the terminal-side distribution key and the terminal-side one-time password against the vehicle-side distribution key and the vehicle-side one-time password stored in the vehicle-side storage, and cause the alarm activator to output an alarm in a case where the terminal-side distribution key and the terminal-side one-time password are not authenticated.

5. A valet key distribution system for valet parking comprising: a vehicle, an owner terminal to be used by a utilization manager of the vehicle, and a guest terminal to be used by a temporary user to temporarily use the vehicle, wherein the valet key distribution system operates in a case of an online environment and in a case of offline environment where there is no online server connection to outside the valet key distribution system;
the valet key distribution system being configured to distribute key information of the vehicle among the vehicle, the owner terminal, and the guest terminal; wherein:
the vehicle comprises first circuitry configured to:
store a vehicle-side owner private key, a vehicle-side distribution key, a vehicle-side variable value, and a vehicle-side one-time password, and
control running of the vehicle and perform information processing in the vehicle;
the owner terminal comprises second circuitry configured to:
receive a utilization manager operation instruction from the utilization manager,
store a terminal-side owner private key, a terminal-side distribution key, a terminal-side variable value, and a terminal-side one-time password, and
perform information processing in the owner terminal;
the guest terminal comprises third circuitry configured to:
receive a temporary user operation instruction from the temporary user,
store the terminal-side distribution key and the terminal-side one-time password received, and
perform information processing in the guest terminal;
the second circuitry of the owner terminal is configured to:
receive an instruction to transmit the terminal-side owner private key, and
transmit, in a case where the instruction to transmit the terminal-side owner private key is received, the stored terminal-side owner private key to the vehicle;
the first circuitry of the vehicle is configured to:
check, upon receiving the terminal-side owner private key from the owner terminal, the received terminal-side owner private key against the stored vehicle-side owner private key,
permit normal use of the vehicle in a case where the terminal-side owner private key is authenticated,
transmit the vehicle-side variable value to the owner terminal,
generate the vehicle-side one-time password based on the vehicle-side variable value, and
store the vehicle-side one-time password;
the second circuitry of the owner terminal is configured to:
rewrite, in a case where the vehicle-side variable value is received from the vehicle, the terminal-side variable value to the vehicle-side variable value received,
store the rewritten terminal-side variable value,
generate the terminal-side one-time password based on the rewritten terminal-side variable value utilizing similar algorithm and computation used in generating the vehicle-side one-time password in the vehicle,
store the terminal-side one-time password, and
update, utilizing a predetermined computation, the terminal-side variable value upon transmitting the terminal-side distribution key and the terminal-side one-time password to the guest terminal;
the third circuitry of the guest terminal is configured to:
store the terminal-side distribution key and the terminal-side one-time password in a case where the terminal-side distribution key and the terminal-side one-time password are received from the owner terminal,
receive an instruction to transmit the terminal-side distribution key, and
transmit, in a case where the instruction to transmit the terminal-side distribution key is received, the terminal-side distribution key and the terminal-side one-time password stored to the vehicle; and
the first circuitry of the vehicle is configured to:
check, upon receiving the terminal-side distribution key and the terminal-side one-time password, the terminal-side distribution key and the terminal-side one-time password against the vehicle-side distribution key and the vehicle-side one-time password stored,
enable some functions of the vehicle to permit limited use of the vehicle in a case where the terminal-side distribution key and the terminal-side one-time password are authenticated,
update, utilizing the predetermined computation, the vehicle-side variable value,
generate the vehicle-side one-time password based on the updated vehicle-side variable value, and
store the vehicle-side one-time password.

* * * * *